(12) United States Patent
Rousson et al.

(10) Patent No.: US 11,823,454 B2
(45) Date of Patent: Nov. 21, 2023

(54) METHOD AND APPARATUS FOR USER INTERACTION WITH A VIDEO STREAM

(71) Applicant: Signality AB, Linköping (SE)

(72) Inventors: Michael Rousson, Ljungsbro (SE); Michael Höglund, Linköping (SE)

(73) Assignee: Signality AB, Linköping (SE)

( * ) Notice: Subject to any disclaimer, the term of this patent is extended or adjusted under 35 U.S.C. 154(b) by 159 days.

(21) Appl. No.: 17/048,479

(22) PCT Filed: Apr. 12, 2019

(86) PCT No.: PCT/EP2019/059413
§ 371 (c)(1),
(2) Date: Oct. 16, 2020

(87) PCT Pub. No.: WO2019/201769
PCT Pub. Date: Oct. 24, 2019

(65) Prior Publication Data
US 2021/0097289 A1  Apr. 1, 2021

(30) Foreign Application Priority Data

Apr. 17, 2018 (DK) .............................. PA201870226

(51) Int. Cl.
*A63F 9/24* (2006.01)
*A63F 11/00* (2006.01)
(Continued)

(52) U.S. Cl.
CPC ................ *G06V 20/42* (2022.01); *G06T 7/20* (2013.01); *G07F 17/3288* (2013.01); *H04N 5/272* (2013.01); *H04N 21/2187* (2013.01)

(58) Field of Classification Search
CPC .............................. G07F 17/32; G07F 17/3201
(Continued)

(56) References Cited

U.S. PATENT DOCUMENTS

2004/0076931 A1\* 4/2004 Rogan .................... G09B 19/18
434/107
2010/0035672 A1\* 2/2010 Root ....................... A63F 13/30
463/2
(Continued)

FOREIGN PATENT DOCUMENTS

WO  WO 2011/070528 A2  6/2011
WO  WO 2011/070528 A3  6/2011

OTHER PUBLICATIONS

International Search Report in International Application No. PCT/EP2019/059413, dated May 23, 2019.
(Continued)

*Primary Examiner* — Adetokunbo O Torimiro
(74) *Attorney, Agent, or Firm* — Knobbe, Martens, Olson & Bear, LLP (57) ABSTRACT

A method and apparatus for user interaction with a video stream includes providing a video stream capturing a live gaming field, analyzing the video stream so as to detect at least one gaming object of the live gaining field in the video stream, mapping position data related to the respective detected gaming object in the video stream into real world locations so as to prove real world location information related to the respective detected gaming object, the mapping being performed based on a known transformation relation between the positions in the video stream and real world locations, identifying a potential future game event or a combination of future game events, and at least occasionally amending the video stream with at least one interactive visual marker related to the identified potential future game event or combination of game events.

21 Claims, 5 Drawing Sheets

(51) Int. Cl.
    *G06F 13/00*     (2006.01)
    *G06F 17/00*     (2019.01)
    *G06V 20/40*     (2022.01)
    *G06T 7/20*     (2017.01)
    *G07F 17/32*     (2006.01)
    *H04N 5/272*     (2006.01)
    *H04N 21/2187*     (2011.01)

(58) Field of Classification Search
    USPC .............................. 463/1, 20, 22, 25, 27, 30
    See application file for complete search history.

(56) References Cited

U.S. PATENT DOCUMENTS

| | | | |
|---|---|---|---|
| 2010/0073484 A1* | 3/2010 | Inagaki ................ | H04N 21/488 348/169 |
| 2011/0013087 A1 | 1/2011 | House et al. | |
| 2012/0046109 A1* | 2/2012 | Shore .................. | G07F 17/3288 463/42 |
| 2012/0214575 A1 | 8/2012 | Amaitis et al. | |
| 2013/0227609 A1 | 8/2013 | Winter et al. | |

OTHER PUBLICATIONS

Summons to attend oral proceedings pursuant to Rule 115(1) EPC, issued in EP Application No. 19718136.5, dated May 24, 2023.

\* cited by examiner

METHOD AND APPARATUS FOR USER INTERACTION WITH A VIDEO STREAM

TECHNICAL FIELD

The present disclosure relates to a method and apparatus for user interaction with a video stream.

BACKGROUND

There are today known systems and methods provided to enable the exploration of event data captured from video feeds, such as from sporting event venues, discovery of relevant events within a video feed of a sporting event, and presentation of and presentation of information related thereto.

US 2015/0248917 discloses a method for taking a video feed of an event and producing a transformed video feed that include at least one highlight that is extracted from machine learning of the event.

SUMMARY

One object of the present disclosure is to provide an improved method for user interaction with a video stream.

The object has in different embodiments been achieved by means of a method for user interaction with a video stream. The method comprises the steps of providing a video stream capturing a live gaming field, analysing the video stream so as to detect at least one gaming object of the live gaming field in the video stream, identifying a potential future game event or a combination of future game events related to any of the detected at least one gaming events, and at least occasionally amending the video stream with at least one interactive visual marker related to the identified potential future game event or combination of game events.

The adding of at least one interactive video marker related to the identified potential future game event to the video stream provides a user interface, which is intuitively used. Further the provided user interface and is easy to use.

The at least one interactive video marker may be at least in part provided in association to one of the detected gaming objects relevant for the identified potential future game event or combination of future game events. Accordingly, the provided user interface inherently relates displayed information to relevant gaming objects. This increases even further the intuitivity and easy to use of the user interface.

In different embodiments, the method for user interaction with a video stream further comprises a step of mapping position data related to the respective detected gaming object in the video stream into real world locations so as to prove real world location information related to the respective detected gaming object, said mapping being performed based on a known transformation relation between the positions in the video stream and real world locations. The method comprises further a step of associating tracking data to the respective detected gaming object. The tracking data is at least partly based on the provided real word location information related to that gaming object. The step of identifying a potential future game event or a combination of future game events is then based on the tracking data and/or historical tracking data from other video streams.

The mapping of position data related to the respective detected gaming object into real world locations allows for providing of real world coordinate tracking data for the respective gaming objects in an efficient manner. Only image processing is required for obtaining the tracking data. For example, no sensors need to be attached to the respective gaming objects.

As the tracking data is provided in real world coordinates, and may be associated to timing information, the tracking data provides an adequate picture of what has happened during a game (match) as a whole and for individual detected gaming objects. The tracking data for one or a plurality of games (matches) may be collected, analysed and used for identifying a potential future game event or combination of future game events.

In different embodiments, the interactive visual marker is associated to real world location information so as to form a virtual object in the video stream.

In different embodiments, the step of at least occasionally amending the video stream with the at least one interactive visual marker comprises obtaining the at least one interactive visual marker for user interaction upon identification of the potential future game event or combination of future game events, and adding the obtained at least one interactive visual marker to the video stream so as to provide an augmented video stream.

The at least one interactive visual marker may be related to user input of an outcome prediction of the potential future game event or combination of potential future game events The step of obtaining the at least one interactive visual marker comprises obtaining the interactive visual marker of first type indicating that user the prediction related to said potential future game event or combination of future game events is pending. The step of adding the obtained visual marker to the video stream comprises then adding the first type visual marker to the video stream.

In different embodiments, the step of obtaining the at least one interactive visual marker comprises upon user activation of the interactive first type interactive visual marker, obtaining an interactive visual marker of second type, said second type interactive visual marker comprising a user interface for user input of an outcome prediction related to the potential future game event or combination of potential future game events. The step of adding the obtained visual marker to the video stream comprises then adding the obtained second type interactive visual marker to the video stream.

In different embodiments, the method further comprises the steps of determining the outcome of the potential future game event or combination of future game events based on the tracking data for at least one of the gaming objects, and visualizing a relation between the user prediction and the determined outcome.

The visualization may comprise information related to a bet gain or loss, for example in the form of a graphics representation.

The visualization may comprise an updated leader-board which may be provided with highlighted position changes.

In different embodiments, the step of visualizing the relation between the user prediction and the determined outcome comprises obtaining a visual marker of a third type visualizing the relation between the user prediction and the determined outcome, and adding the obtained third type visual marker to the video stream.

The third type visual marker may be an interactive visual marker and/or associated to real world location information so as to form a virtual object in the video stream.

In different embodiments, the video stream is amended with the interactive visual marker when a predetermined condition is fulfilled, such as at a predetermined timing and/or a predetermined gaming object location and/or upon determination that a predetermined game event has occurred.

The gaming objects may comprise at least one of the following objects: a ball, a hockey puck, a player and/or a goal.

The tracking data related to the gaming objects may comprise real word location information related to that gaming object.

The tracking data related to at least one of the gaming objects may comprise at least one of the game related tasks: passes, interceptions, shots, throw-ins, forehand strokes, backhand strokes, goals, goal kicks, nicks, goal-nicks, smashes, saves, fouls, kicks, bounces, strikes, yellow/red cards, off sides and/or corners.

The potential future game event or combination of future game events may be related to at least one of the following:
 velocity of at least one of the gaming objects,
 a real world location of a gaming object such as a point where the ball hit the ground),
 a task or combination of tasks such as a number count of consecutive passes within a team.

In different embodiments, at least one interactive visual marker related to an outcome prediction of the potential future game event or combination of potential future game events comprises information related to an odds for the outcome of the potential future game event or combination of potential future game events.

The present disclosure relates further in different embodiments to software for performing the method for user interaction with a video stream as defined above.

The present disclosure relates further in different embodiments to an apparatus for user interaction with a video stream. The apparatus comprises a receiver arranged to receive a video stream capturing a live gaming field, a processing element and an output element arranged to supply the augmented video stream to a display element.

The processing element is arranged to process the video stream so as to detect at least one gaming object of the live gaming field in the video stream, map position data related to the respective detected gaming object in the video stream into real world locations so as to prove real world location information related to the respective detected gaming object, said mapping being performed based on a known transformation relation between the positions in the video stream and real world locations, identify a potential future game event or a combination of future game events, at least occasionally obtain at least one interactive visual marker related to the identified potential future game event or combination of game events and amend (S6, S7) the video stream with at obtained least one interactive visual marker to obtain an augmented video stream.

In different embodiments, the processing element is further arranged to associate tracking data to the respective detected gaming object, said tracking data being at least partly based on the provided real word location information related to that gaming object. The identification of a potential future game event or a combination of future game events is then based on the tracking data and/or historical tracking data from other video streams.

The present disclosure further relates to a system for user interaction with a video stream. The system comprises an apparatus as defined above receiving a video stream, a monitor connected to the apparatus and fed with an augmented video stream for presentation, and a user element for user interaction with the augmented video stream as presented on the monitor.

DETAILED DESCRIPTION

Figure 1:
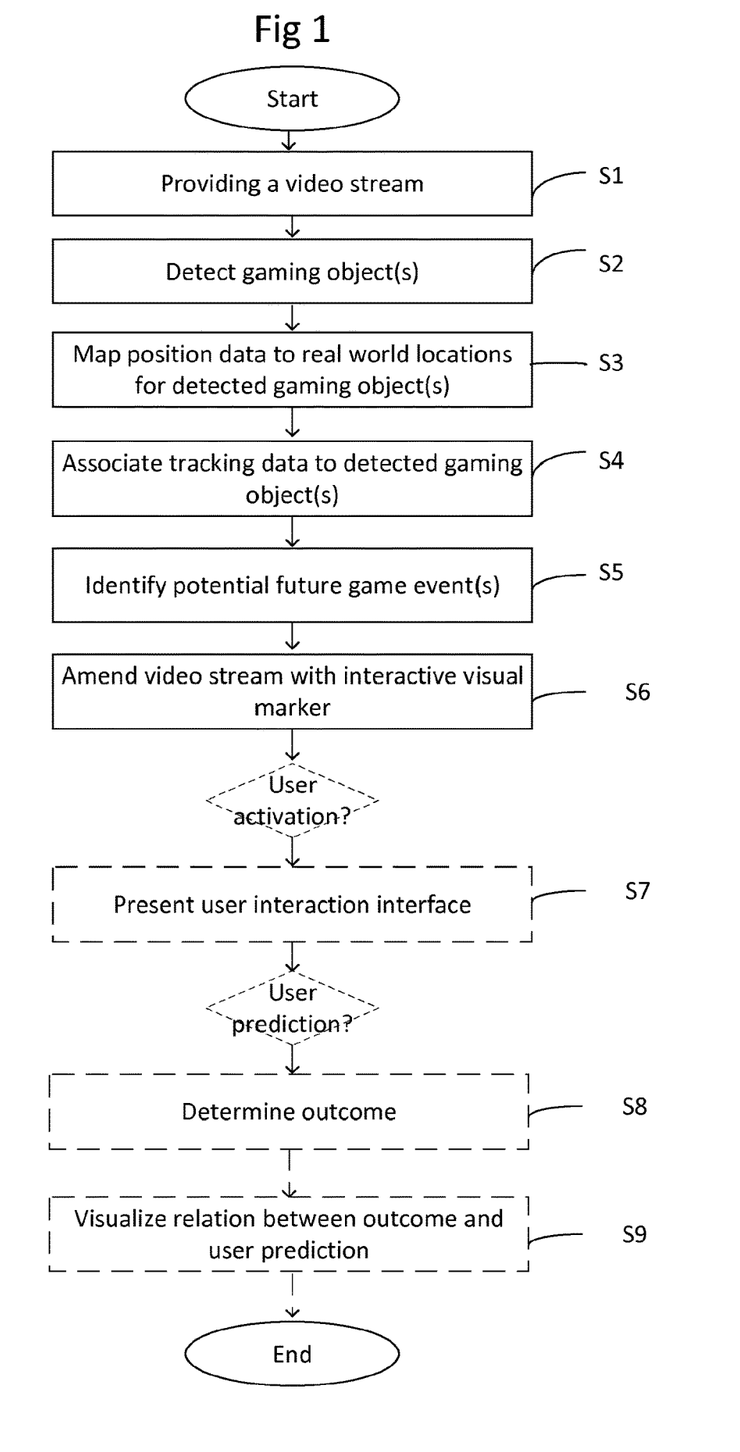
FIG. 1 is a flow chart illustrating an example of a method for user interaction with a video stream.

FIG. 1 is a flow chart illustrating a method for user interaction with a video stream. The interaction is characteristically at least in part taking place with the video stream itself.

The video stream may capture a gaming field. The gaming field may be related to a sporting events venue. The sports field may for example be a football field, soccer field, tennis court, tennis court, basketball court or a hockey rink.

The method for user interaction with a video stream comprises a step of providing S1 a video stream capturing the gaming field.

The video stream may be provided by means of a camera having a field of view covering at least a part of the gaming field. In one example a plurality of cameras are used to cover the gaming field. The camera(s) may be positioned on the ground or above. The camera(s) may be arranged to capture a side view of the gaming field. Thus, an angle between the gaming field and an optical axis of the camera may be smaller than let us say 80°. Preferably, the angle is somewhere between 15° and 45°.

In one example, the camera is positioned at a fixed position. The camera may have a fix angular rotation angle. Alternatively, the camera is angularly rotatable in two or three dimensions. In one example, the camera is mounted on a movable platform. The movable platform may for example be a rail. A human may carry the camera. The movable platform may be an airborne platform such as a drone.

The camera(s) providing the video stream may for example be a video camera or a mobile phone camera.

The video stream may be provided as close to in real time as possible with regard to communication channels to the video camera or the like capturing the video stream of the gaming field. This is in particular important when the provided video stream relates is transmitted directly from the video camera for live streaming. Alternatively, the video stream is a recorded video-stream provided from a video storing medium.

The method further comprises a step of analysing S2 the video stream so as to detect at least one gaming object of the live gaming field in the video stream. The detected objects may for example comprise at least one of the following objects: a ball, a hockey puck, a player and/or a goal.

For example when the gaming field is a soccer field, the gaming objects may comprise movable gaming objects such as a ball, the players of the respective team and referee(s). The gaming objects may further comprise static gaming objects such as the goals.

For example, when the gaming field is a tennis court, the gaming objects may comprise gaming objects such as the ball and/or the players. Further, the gaming objects may comprise static gaming objects such as a net.

In detail, an image processor may at least initially process some of the images in the video stream to identify movable gaming objects and any static gaming objects. Any pre-stored information related to the video stream may be used in the identification. For example, information related to the type of game may be used in the identification. The information related to a type of game may include information related to number of players, type of players and characteristics associated to each type of player.

For example, information for identification of gaming objects related to a soccer game may comprise information defining that a soccer game characteristically comprises one gaming object in the form of a ball, eleven players in each team, a set number of referees and two goals. To each or some of the gaming object types, a typical movement pattern may also be provided for facilitating the identification. Further, information related to characteristic size and/or shape of the respective gaming object type may also be provided to facilitate the identification.

Further, detailed information related to respective team and/or player may also be provided for the identification, such as characteristic clothing for the respective team and/or information related to which player has the respective shirt number for the respective team, and/or information related to which role each player of the respective team has (such as goalkeeper, back, midfielder, forward). As the information for aiding identification and subsequent tracking is provided on individual basis, the information related to the respective player may comprise characteristic information related to that individual such as a movement pattern characteristic for that person and/or physical characteristics, such as length etc.

Once the gaming objects have been identified in the video stream, their positions in the video stream, i.e. respective image are noted. The positions may for example be pixels in the video stream associated to that identified gaming object.

The positions of the respective gaming objects in the provided video stream are thereupon tracked for example based on at least one identifier associated to that gaming object. The identifier may comprise at least some of the characteristics mentioned above in relation to the identification of the respective gaming object, such as shirt number and/or role of the gaming object and/or physical characteristics.

The method further comprises a step of mapping S3 position data, such as pixel data, related to the respective detected gaming object in the video stream into real world locations so as to prove real world location information related to the respective detected gaming object. The mapping is characteristically performed based on a known transformation relation between the positions in the video stream and real world locations.

The known transformation may for example be made based on a known size of the gaming field. For example, a soccer gaming field has a known size. The gaming field may also have other characteristics features such as lines painted at given locations within the gaming field. The images of the gaming field may also contain other information which may be used for transformation of the image positions into real world coordinates.

The real world coordinates are then provided based on the mapping between the respective position in then video stream and a real world position, wherein the real world position is given in a predetermined real world coordinate system. The real world coordinate system may for example have its origin somewhere in relation to the gaming field such as in one of its corners or in the middle of the gaming field. In another example, the real world coordinate system is a georeferenced coordinate system. However, these are only examples; the only important thing is that the real world coordinate system uses real world distance as a reference unit. Meters is a commonly used unit for the real world coordinate system.

The mapping is in one example performed in two dimensions for some or each of the gaming objects. In accordance with this example is when the video camera is positioned at a fixed position and having a fix angular rotation angle the mapping substantially static. This means that a position (one or a plurality of pixels) in any image of the video stream corresponds to a predetermined real world position.

The mapping may be made in three dimensions for at least some of the gaming objects. For example, it may be advantageous to determine the location of a ball of the gaming field in a three-dimensional coordinate system. In order to determine the real world coordinate in three dimensions, for example additional information may be used such as a size of the gaming object in the images of the video stream in relation to an actual size of the gaming object. This relation may for example be used for determining a distance or relation to the gaming object and to determine the real world three dimensional coordinate based on the above discussed transformation of the determined position in the images of the video stream and based on the determined distances or relations.

This mapping will be continuously performed as the respective gaming object is tracked.

The transformation may be obtained using a hardware solution which tracks the camera itself or with an image based solution which estimates camera position from the image/video content, or a combination thereof.

The method may further comprise a step of associating S4 tracking data to the respective detected and tracked gaming object. The tracking data is at least partly based on the provided real word location information related to that gaming object.

As described above, at least some of the identified gaming objects are continuously tracked. This may be performed based on previously obtained position information related to the identified gaming object. The obtained position information may comprise the real world position and/or position in the respective image. As also stated above, the tracking may be performed based on characteristics associated to the individual tracked gaming objects, such as a shirt number etc.

The tracking data associated to the respective gaming object comprising real world locations may be continuously formed based on the mapping as discussed above.

The tracking data may further comprise gesture data. The gesture data may for example be detected by means of image processing of the video sequences. The continuously formed real world location and/or the gesture data may be used to identify at least one of the following game related tasks: passes, interceptions, shots, throw-ins, forehand strokes, backhand strokes, goals, goal kicks, nicks, goal-nicks, smashes, saves, fouls, kicks, bounces, strikes, yellow/red cards, off sides and/or corners. The game related task(s) may also form part of the tracking data.

The method further comprises a step of identifying S5 a potential future game event or a combination of future game events. The identification may be made based on the tracking data and/or historical tracking data from other video streams. The historical tracking data from other streams may relate to one or a plurality of games which took place for example a week ago or the latest predetermined number of weeks or months etc.

Thus, the identification of the potential future game event may be made based on
  Real world location(s) related to one or a plurality of the gaming objects
  Gesture data,
  Game related tasks such as: passes, interceptions, shots, throw-ins, forehand strokes, backhand strokes, goals, goal kicks, nicks, goal-nicks, smashes, saves, fouls, kicks, bounces, strikes, yellow/red cards, off sides and/or corners.

The identification of the potential future game event or combination of future game events may be made based on a comparison between tracking data associated to one or a plurality of historical game(s) and the present game to identify similar situations and based on the game event or combination of game events which took place subsequent said similar situation in the historical game.

The potential future game event or combination of future game events are related to at least one of the following:
  velocity of at least one of the gaming objects,
  a real world location of a gaming object such as a point where the ball hit the ground,
  a task or combination of tasks such as a number count of consecutive passes within a team.

The potential future game event or combination of future game events related to the velocity of at least one of the game events may for example relate to which player will run fastest, which player will run faster than a given player or how fast will a given player run in a next action. The velocity information related to the respective gaming object may be determined based on the continuously tracked real world locations.

The potential future game event or combination of future game events related to the real world location will for example relate to whether the ball next will hit the ground in a given zone of the gaming field.

The potential future game event or combination of future game events related to a task or combination of tasks may as stated above for example comprise a number count of consecutive passes within a team. However, the potential future game event or combination of future game event(s) may comprise a number count of tasks of any type related to a specific player, a group of players, an entire team or all players.

The above mentioned examples are present for illustrating purposes. Any potential future game event or combination of future game events may be formed based on the tracking data as long as it can later be determined by the tracking data whether the potential future game event or combination of future game events occurred or not. The potential future game event or combination of future game events may instead or in addition thereto be determined without the tracking data. Such future game events may include use of a yellow and/or red card, throw-ins etc. These events man be directly detected from the image/video. No intermediate tracking may be required related to these events.

The method further comprises a step of at least occasionally amending S6, S7 the video stream with at least one interactive visual marker related to the identified potential future game event or combination of game events.

The video stream may be amended when the potential future game event or combination of future game events has been identified.

Instead or in addition thereto, the video stream may be amended with the interactive visual marker when a predetermined condition is fulfilled, such as at a predetermined timing and/or a predetermined gaming object location and/or upon determination that a predetermined game event has occurred.

The interactive visual marker may be associated to real world location information so as to form a virtual object in the video stream. The real world location and physical characteristics of the gaming objects may also be used to correctly place the virtual object in relation to the real gaming objects in the video screen.

The step of at least occasionally amending S6, S7 the video stream with the at least one interactive visual marker comprises in one example obtaining the at least one interactive visual marker for user interaction upon identification of the potential future game event or combination of future game events, and adding the obtained at least one interactive visual marker to the video stream so as to provide an augmented video stream.

The at least one interactive visual marker may form part of an interface for user input of an outcome prediction of the potential future game event or combination of potential future game events In the illustrated example, a first type interactive visual marker is amended S6 to the video stream and upon user activation of the first type interactive visual marker, presenting S7 a second type interactive visual marker in the video stream. In the illustrated example, the second type interactive visual marker forms a user interaction interface for user input of a prediction.

The method may further comprise a step of determining S8 the outcome of the potential future game event or combination of future game events based on the tracking data for at least one of the gaming objects. The outcome may be given in relation to the user prediction.

The method may further comprise a step of visualizing S9 a relation between the user prediction and the determined outcome. Thus, the visualization forms a presentation of the user's prediction success.

The visualization may comprise information related to a bet gain or loss, for example in the form of a graphics representation. This visualization is for example used in a betting application.

The visualization may comprise an updated leader-board which may be provided with highlighted position changes. This visualization is for example used in a social gaming application.

The at least one interactive visual marker related to an outcome prediction of the potential future game event or combination of potential future game events may comprise information related to an odds for the outcome of the potential future game event or combination of potential future game events.

Thus, the interactive visual marker is formed within the video stream itself and it may be formed as a visual object formed in the video stream using the real world coordinate system. Further the interactive visual marker is as is apparent from the term used interactive. Thus, the user can act with augmented video stream for example by means of a joystick, keyboard, touch screen, speech recognition etc.

The interaction may involve marking the interactive visual marker, marking a selection from a plurality of selection alternatives as presented by the interactive visual marker or user input of any text, sign etc. Thus, the interaction is characteristically at least in part taking place with the video stream itself.

The augmented video stream may comprise any other visual markers providing information. For example visual markers (interactive or not) associated to different gaming objects may at occasion be added to the video stream. Those additional visual markers may for example present information related to the respective gaming object, such as facts about the player (if the gaming object is a player), present speed, achievements in the ongoing game etc.

Figure 2:
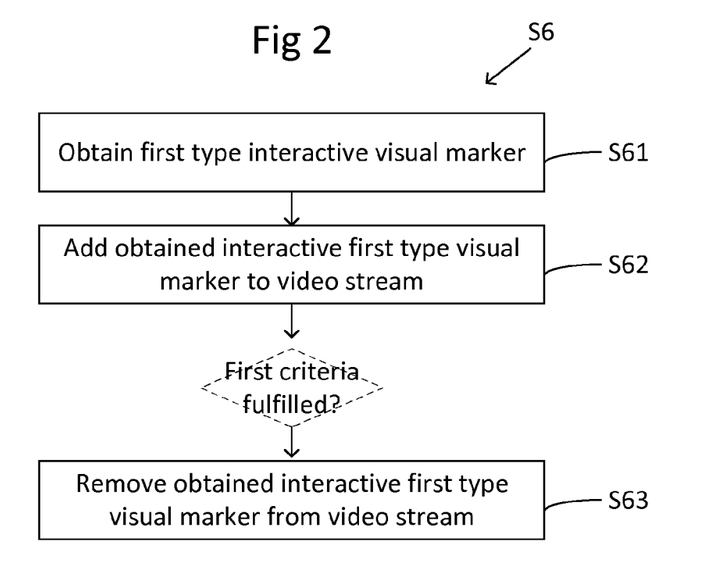
FIG. 2 is a flowchart illustrating an example of a step of a step of at least occasionally amending the video stream with the at least one interactive visual marker in the exemplary method in FIG. 1.

FIG. 2 illustrates a step of at least occasionally amending the video stream with the at least one interactive visual marker. The step comprises in accordance with this example obtaining S61 the interactive visual marker of first type indicating to the user that a user prediction related to a potential future game event or combination of future game events is pending, and adding S62 the first type visual marker to the video stream.

The first type interactive visual marker(s) may be added to the video stream at or in the vicinity of a gaming object relevant for the potential future game event or combination of game events.

Alternatively or in addition thereto, the first type visual marker(s) may be added to the video stream in a generic location in the video stream with little activity. This may for example be made when the potential future game event or combination of game events relates to no specific gaming object or to a group of gaming objects. Once the first type interactive visual marker has been marked or selected by the user, the first type interactive visual marker may be removed from the video stream.

Further, the first type interactive visual marker may be removed S63 when a first criterion has been fulfilled. The first criterion may comprise a criterion that a predetermined first time period has passed. The first criterion may be based on whether the potential future game event or combination of potential future game events is still relevant.

Figure 5:
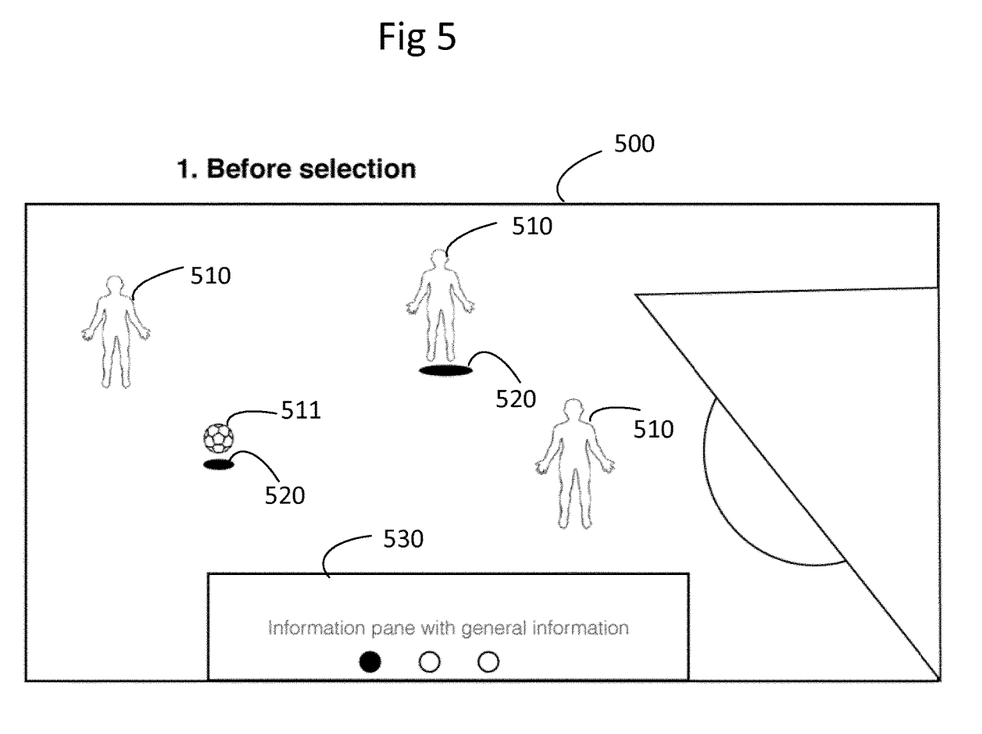
FIG. 5 illustrates an example of a video stream augmented with a first type interactive visual marker.

In FIG. 5, a schematic augmented video image 500 is illustrated for a situation before selection of at least one potential future game event. In the illustrated schematic augmented video image 500 a plurality of gaming objects 510, 511 are illustrated. The gaming objects include in the illustrated example a plurality of gaming objects 510 in the form of players. The gaming objects include in the illustrated example a gaming object 511 in the form of a ball. First type visual interactive markers 520 are comprised in the augmented video image. Each first type visual interactive marker is in the illustrated example associated to an individual gaming object. Each first type visual interactive marker 520 may indicate that one or a plurality of potential future game event or combination of game events related to this gaming object are available for selection.

The augmented video image comprises in the illustrated example further a first information pane 530. This first information pane may be positioned in a generic location in the video stream with little activity.

The first information pane 530 may display information related to the potential future game event or combination of game events related to the respective first type visual interactive markers 520 available for selection. The first information pane may also comprise an interactive element for selection of a specific potential future game event or combination of game events related to a first type visual interactive marker 520 in a situation where a plurality of potential future game events are available for that first type visual interactive marker 520. This interactive element may then form part of the respective first type visual interactive marker. For example, in order to select a potential future game event or combination of game events the user may first select one of the first type visual interactive markers related to a specific gaming object and then, if a plurality of potential future game event options are available, select one of the available options on the information pane.

The first information pane 530 may also display information related to potential future game event or combination of game events available for selection related to no specific gaming object. The first information pane 530 may then comprise an interactive element for selection of such potential future game event or combination of game events related to no specific gaming object. The interactive element for selection of such potential future game event or combination of game events related to no specific gaming object then forms a first type visual interactive marker.

Figure 3:
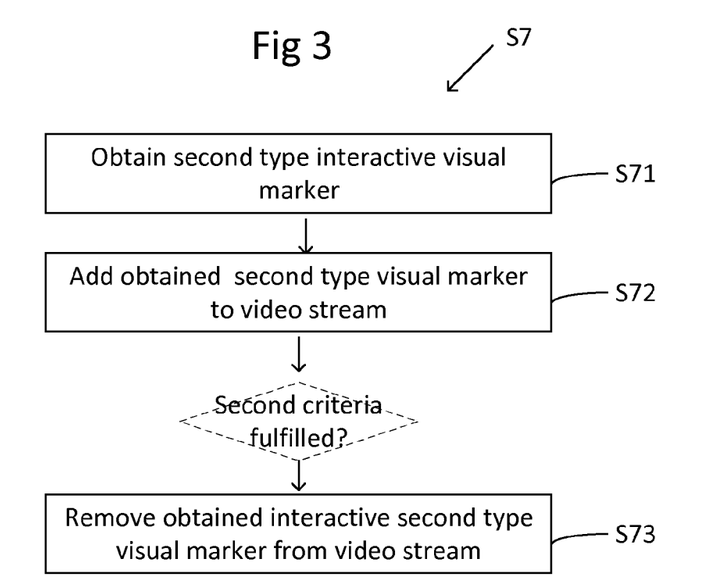
FIG. 3 is a flow chart illustrating an example of a step of obtaining the at least one interactive visual marker.

FIG. 3 illustrates a step of at least occasionally amending the video stream with the at least one interactive visual marker. In the illustrated example, this step comprises upon user activation of the interactive first type interactive visual marker, obtaining S71 an interactive visual marker of second type. The second type interactive visual marker comprises a user interface for user input of an outcome prediction related to the potential future game event or combination of potential future game events. The step of adding the obtained visual marker to the video stream comprises adding 72 the obtained second type interactive visual marker to the video stream.

The second type interactive visual marker may be added to the video stream in substantially the same location as the first type interactive visual marker.

The second type interactive visual marker may be added to the video stream at or in the vicinity of a gaming object relevant for the potential future game event or combination of game events. Alternatively, the second type visual marker may be added to the video stream in a generic location in the video stream with little activity. This may for example be made when the potential future game event or combination of game events relates to all or many of the gaming objects.

Once an outcome prediction related to the potential future game event or combination of potential future game events has been obtained by means of user input, the second type interactive visual marker may be removed from the video stream. A (not shown) visual marker may then be obtained and included in the video stream, which visual marker indicates that an outcome prediction has been made.

Further, the second type interactive visual marker may be removed S73 when a second criterion has been fulfilled. The second criterion may comprise a criterion that a predetermined second time period for user input of an outcome prediction has passed. The second criterion may comprise a criterion that the outcome prediction related to the potential future game event or combination of potential future game events is still relevant.

Figure 6:
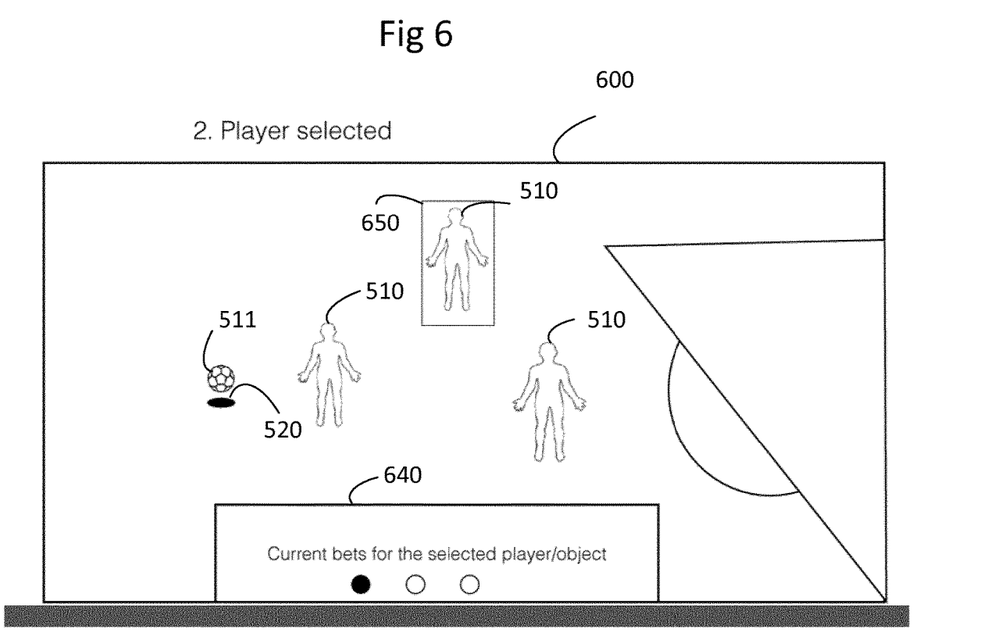
FIG. 6 illustrates an example of a video stream augmented with a second type interactive visual marker.

In FIG. 6, a schematic augmented video image 600 is illustrated for a situation after a user activation of at least one potential future game event. Thus, the schematic augmented video image 600 discloses a situation wherein upon user activation of an interactive first type interactive visual marker 520, the activated gaming object may be marked by means of a visible marker 650.

In the illustrated schematic augmented video image 600 a plurality of gaming objects 510, 511 are illustrated. The gaming objects include in the illustrated example a plurality of gaming objects 510 in the form of players. The gaming objects include in the illustrated example a gaming object 511 in the form of a ball. In the illustrated example, first type visual interactive markers 520 are comprised in the augmented video image related to the gaming objects, which have not been activated. Each first type visual interactive marker 520 may indicate that one or a plurality of potential future game event or combination of game events related to this gaming object are available for selection are also available for selection. In an alternative example (not shown), all first type interactive visual markers 520 are removed upon user activation of one of the first type interactive visual marker.

The augmented video image comprises in the illustrated example further a second information pane 640. This second information pane may be positioned in a generic location in the video stream with little activity. The second information pane may instead be located in association to the activated gaming object (not shown). At least in this case, the In this case, the visible marker 650 may be superfluous. Also, in a case when the selected potential game event relates to no specific gaming object, the visual marker 650 is superfluous.

The second information pane 640 forms an interactive visual marker of second type.

The second type interactive visual marker 640 comprises a user interface for user input of an outcome prediction related to the selected potential future game event or combination of potential future game events. In the illustrated example, a plurality of selectable outcome predictions are visualised by the second type visual marker. Alternatively, the second type visual marker may form an interface for user input of any outcome prediction.

In a betting application, the second type interactive visual marker may display information related to current available bet(s).

Once an outcome prediction related to the potential future game event or combination of potential future game events has been obtained by means of user input, the second type interactive visual marker may be removed from the video stream. A (not shown) visual marker may then be obtained and included in the video stream, which visual marker indicates that an outcome prediction has been made.

Figure 4:
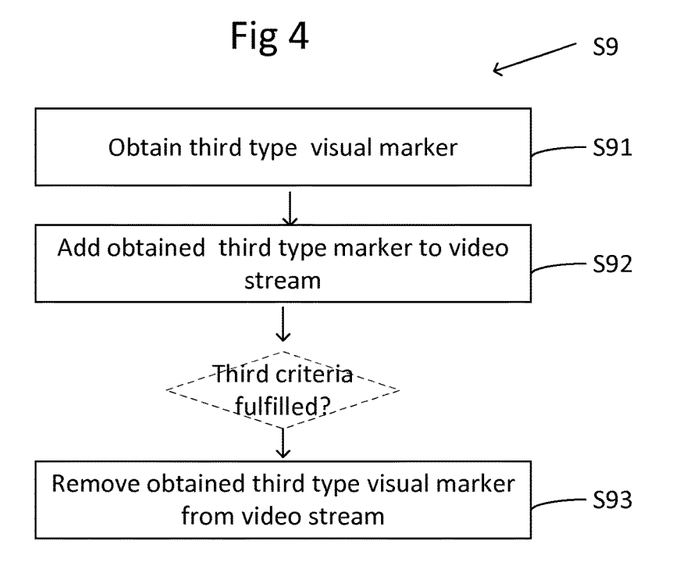
FIG. 4 illustrates an example of the step of visualizing the relation between the user prediction and the determined outcome.

FIG. 4 illustrates an example of the step of visualizing the relation between the user prediction and the determined outcome. The step comprises obtaining S91 a visual marker of a third type visualizing the relation between the user prediction and the determined outcome, and adding S92 the obtained third type visual marker to the video stream.

The third type visual marker may comprise an interactive visual marker.

The third type visual marker may be associated to real world location information so as to form a virtual object in the video stream.

Thus, the visualization forms a presentation of the user's prediction success.

The visualization may comprise information related to a bet gain or loss, for example in the form of a graphics representation. This visualization is for example used in a betting application.

The visualization may comprise information related to odds for the outcome of the potential future game event or combination of potential future game events.

The visualization may comprise an updated leader-board which may be provided with highlighted position changes. This visualization is for example used in a social gaming application.

The third type visual marker may be added S92 to the video stream in substantially the same location as the second type and/or first type interactive visual marker.

The third type visual marker may be added S92 to the video stream at or in the vicinity of a gaming object relevant for the potential future game event or combination of game events. Alternatively, the third type visual marker may be added to the video stream in a generic location in the video stream with little activity. This may for example be made when the potential future game event or combination of game events relates to all or many of the gaming objects.

Further, the third type visual marker may be removed S93 when a third criterion has been fulfilled. The third criterion may comprise a criterion that a predetermined third time period for user input of an outcome prediction has passed. The third criterion may comprise that the user has interacted with the third type visual marker.

Figure 7:
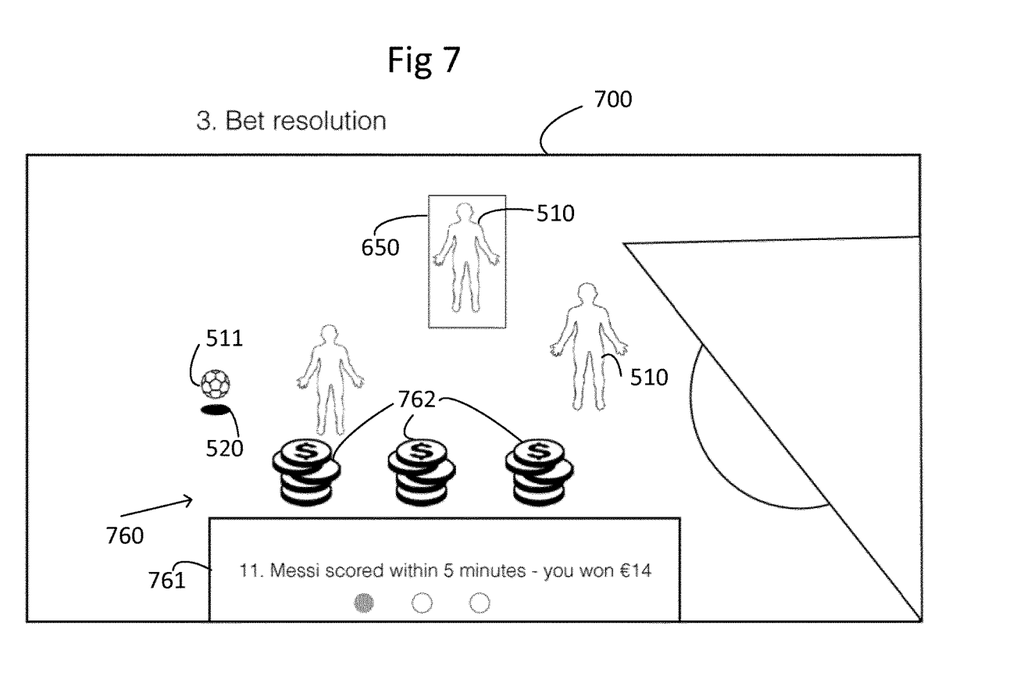
FIG. 7 illustrates an example of a video stream augmented with a third type visual marker.

In FIG. 7, a schematic augmented video image 700 is illustrated, which visualizes the relation between the user prediction and the determined outcome.

In the illustrated schematic augmented video image 700 a plurality of gaming objects 510, 511 are illustrated. The gaming objects include in the illustrated example a plurality of gaming objects 510 in the form of players. The gaming objects include in the illustrated example a gaming object 511 in the form of a ball. In the illustrated example, first type visual interactive markers 520 are comprised in the augmented video image related to the gaming objects, which have not been activated. Each first type visual interactive marker 520 may indicate that one or a plurality of potential future game event or combination of game events related to this gaming object are available for selection. In an alternative example (not shown), all first type interactive visual markers 520 are removed until the activated user prediction has been finalized.

In the illustrated example, the activated gaming object is marked by means of a visible marker 650.

The augmented video image 700 comprises an obtained visual marker of a third type 760 visualizing the relation between the user prediction and the determined outcome.

In the illustrated example, the third type visual marker 760 comprises a third information pane 761. The third information pane 761 may be positioned in a generic location in the video stream with little activity. The third 761 information pane may instead be located in association to the activated gaming object (not shown). The third information pane 761 may display information related to the relation between the user prediction and the determined outcome. In the illustrated example, the result of the potential future game event (or combination of potential future game events) is shown. Further, information related to the outcome of the user prediction is shown.

In the illustrated example, the third type visual marker 760 further comprises at least one graphic representation 762 illustrating the outcome pf the user prediction.

The third type visual marker 760 may be removed when a predetermined time period has passed and/or when the user has interacted with the third type visual marker. At least in the latter case, the third type visual marker is interactive.

Figure 8:
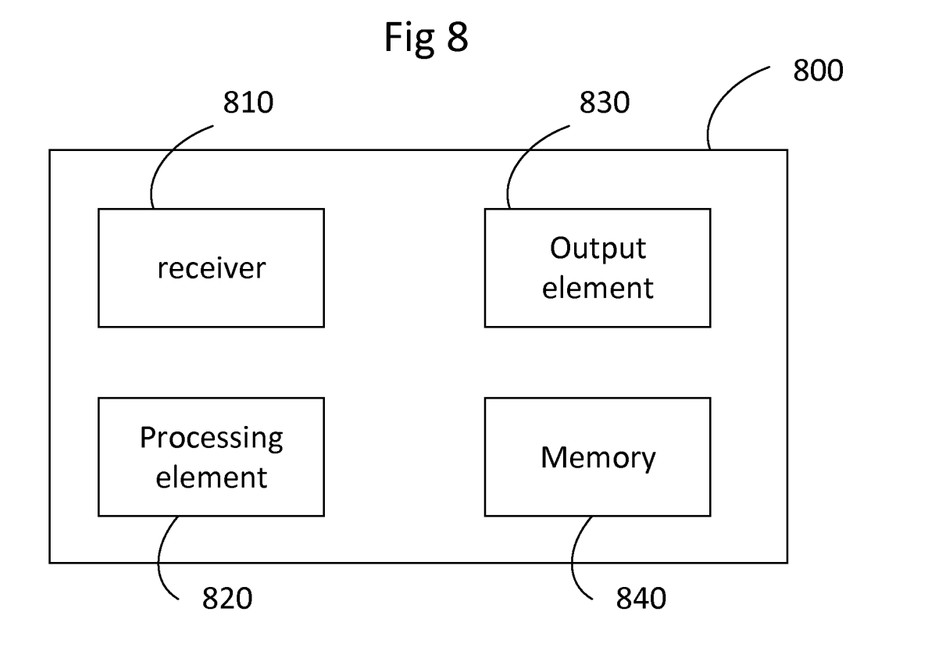
FIG. 8 is a schematic block scheme illustrating an example of apparatus for user interaction with a video stream.

FIG. 8 is a schematic block scheme illustrating an apparatus 800 for user interaction with a video stream.

The apparatus 800 comprises a receiver 810 arranged to receive a video stream capturing a live gaming field, a processing element, or processor, 820 and an output element 830 arranged to supply an augmented video stream to a display element (not disclosed). The apparatus may further comprise a memory 840. The memory 840 may be arranged to store video streams possibly with tracking data as disclosed herein associated thereto.

The processing element 820 may be arranged to process the received video stream so as to detect at least one gaming object of the live gaming field in the video stream, map position data related to the respective detected gaming object in the video stream into real world locations so as to prove real world location information related to the respective detected gaming object, said mapping being performed based on a known transformation relation between the positions in the video stream and real world locations, associate tracking data to the respective detected gaming object, said tracking data being at least partly based on the provided real word location information related to that gaming object, identify a potential future game event or a combination of future game events based on the tracking data and/or historical tracking data from other video streams, and at least occasionally obtain at least one interactive visual marker related to the identified potential future game event or combination of game events and amend the video stream with at obtained least one interactive visual marker to obtain an augmented video stream.

The output element 830 supplies the augmented video stream to the display element.

The processing element may comprise software for operating in accordance with the above.

Figure 9:
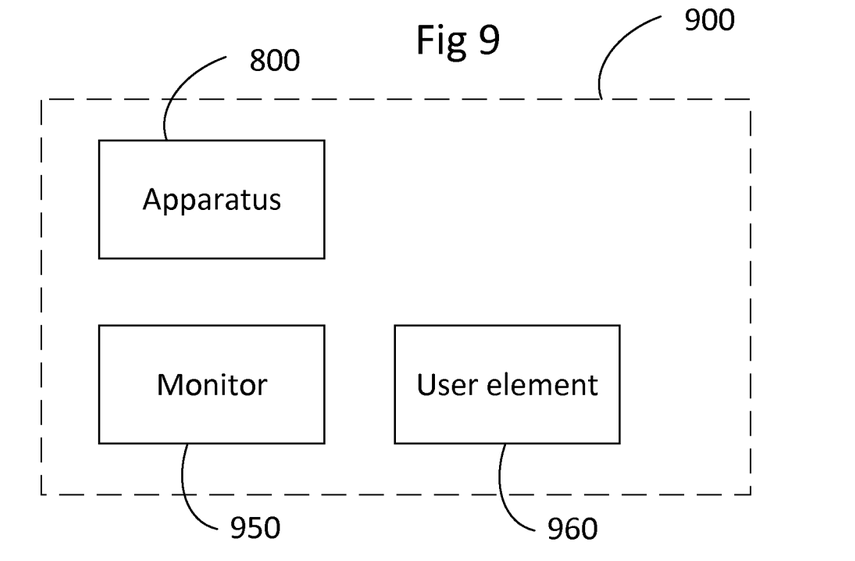
FIG. 9 is a schematic block scheme illustrating a system 900 for user interaction with a video stream.

FIG. 9 is a schematic block scheme illustrating a system 900 for user interaction with a video stream.

The system 900 comprises an apparatus arranged to obtain an augmented video stream based on a received video stream. The apparatus may have some or all of the features as discussed in relation to FIG. 8.

A monitor 950 is connected to the apparatus 800 and fed with the augmented video stream for presentation. The monitor is for example a TV screen or a computer screen.

The system 900 comprises further a user element 960 for user interaction with the augmented video stream as presented on the monitor 950. The user element comprises for example a joystick, a computer mouse, a key board, a touch screen of the monitor, speech recognition etc.

What is claimed is:

1. A computer implemented method for user interaction with a video stream, said method comprising:
   receiving a video stream of a live gaming field from at least one camera;
   analysing, by a processor, the video stream so as to detect at least one gaming object of the live gaming field in the video stream by identifying movable gaming objects or static gaming objects in the video stream;
   identifying, by the processor, a potential future game event or a combination of future game events related to any of the detected at least one gaming object; and
   at least occasionally amending, by the processor, the video stream with at least one interactive visual marker for user interaction related to the identified potential future game event or combination of game events, wherein said at least occasionally amending the video stream with the at least one interactive visual marker for user interaction comprises:

obtaining, by the processor, the at least one interactive visual marker for user interaction upon identification of the potential future game event or combination of future game events, and
   adding, by the processor, the obtained at least one interactive visual marker in a location adjacent to the detected at least one gaming object in the video stream so as to provide an augmented video stream, the at least one interactive visual marker indicating that the potential future game event or the combination of future game events are available for user selection; and
   displaying, at a display element, the augmented video stream,
   wherein the at least one interactive visual marker comprises a user interface for a user to input an outcome prediction of the potential future game event or combination of potential future game events in the augmented video stream.

2. The method for user interaction with a video stream according to claim 1, further comprising:
   mapping position data related to the respective detected gaming object in the video stream into real world locations so as to prove real world location information related to the respective detected gaming object, said mapping being performed based on a known transformation relation between the positions in the video stream and real world locations,
   associating tracking data to the respective detected gaming object, said tracking data being at least partly based on the provided real word location information related to that gaming object,
   wherein said identifying a potential future game event or a combination of future game events is based on the tracking data and/or historical tracking data from other video streams.

3. The method according to claim 1, wherein the interactive visual marker is associated to real world location information so as to form a virtual object in the video stream.

4. The method according to claim 1,
   wherein said obtaining the at least one interactive visual marker comprises obtaining the interactive visual marker of first type indicating that user the prediction related to said potential future game event or combination of future game events is pending, and
   wherein said adding the obtained visual marker to the video stream comprises adding the first type visual marker to the video stream.

5. The method according to claim 4, wherein
   said obtaining the at least one interactive visual marker comprises upon user activation of the interactive first type interactive visual marker, obtaining an interactive visual marker of second type, said second type interactive visual marker comprising a user interface for user input of an outcome prediction related to the potential future game event or combination of potential future game events, and
   said adding the obtained visual marker to the video stream comprises adding the obtained second type interactive visual marker to the video stream.

6. The method according to claim 1, further comprising:
   determining the outcome of the potential future game event or combination of future game events based on the tracking data for at least one of the gaming objects, and
   visualizing a relation between the user prediction and the determined outcome.

7. The method according to claim 6, wherein the visualization comprises information related to a bet gain or loss, for example in the form of a graphics representation.

8. The method according to claim 6, wherein the visualization may comprise an updated leader-board which may be provided with highlighted position changes.

9. The method according to claim 6, wherein said visualizing the relation between the user prediction and the determined outcome comprises:
  obtaining a visual marker of a third type visualizing the relation between the user prediction and the determined outcome, and
  adding the obtained third type visual marker to the video stream.

10. The method according to claim 9, wherein the third type visual marker is an interactive visual marker and/or associated to real world location information so as to form a virtual object in the video stream.

11. The method according to claim 1, wherein the video stream is amended with the interactive visual marker when a predetermined condition is fulfilled, such as at a predetermined timing and/or a predetermined gaming object location and/or upon determination that a predetermined game event has occurred.

12. The method according to claim 1, wherein the gaming objects comprise at least one of the following objects: a ball, a hockey puck, a player and/or a goal.

13. The method according to claim 1, wherein the tracking data related to the gaming objects comprises real word location information related to these gaming object.

14. The method according to claim 1, wherein the tracking data related to at least one of the gaming objects comprises at least one of the game related tasks: passes, interceptions, shots, throw-ins, forehand strokes, backhand strokes, goals, goal kicks, nicks, goal-nicks, smashes, saves, fouls, kicks, bounces, strikes, yellow/red cards, off sides and/or corners.

15. The method according to claim 1, wherein the potential future game event or combination of future game events are related to at least one of the following:
  (a) velocity of at least one of the gaming objects,
  (b) a real world location of a gaming object such as a point where the ball hit the ground),
  (c) a task or combination of tasks such as a number count of consecutive passes within a team.

16. The method according to claim 1, wherein the at least one interactive visual marker related to an outcome prediction of the potential future game event or combination of potential future game events comprises information related to an odds for the outcome of the potential future game event or combination of potential future game events.

17. A software for performing the method for user interaction with a video stream according to claim 1.

18. The method according to claim 1, wherein the interactive visual marker in the augmented video stream indicates that the outcome prediction has been made by the user through the user interface.

19. An apparatus for user interaction with a video stream, said apparatus comprising:
  a receiver arranged to receive a video stream of a live gaming field from at least one camera;
  a processing element, said processing element being arranged to:
    process the video stream so as to detect at least one gaming object of the live gaming field in the video stream by identifying movable gaming objects or static gaming objects in the video stream,
    identify a potential future game event or a combination of future game events related to any of the detected at least one gaming object,
    at least occasionally obtain at least one interactive visual marker related to the identified potential future game event or combination of game events, and
    amend the video stream with said obtained least one interactive visual marker to obtain an augmented video stream such that said obtained least one interactive visual marker is disposed in a location adjacent to the detected at least one gaming object in the video stream, the at least one interactive visual marker indicating that the potential future game event or the combination of future game events are available for user selection; and
  an output element arranged to supply the augmented video stream to a display element,
  wherein the at least one interactive visual marker comprises a user interface for a user to input an outcome prediction of the potential future game event or combination of potential future game events in the augmented video stream.

20. The apparatus according to claim 19, wherein the processing element further being arranged to:
  map position data related to the respective detected gaming object in the video stream into real world locations so as to prove real world location information related to the respective detected gaming object, said mapping being performed based on a known transformation relation between the positions in the video stream and real world locations, and
  associate tracking data to the respective detected gaming object, said tracking data being at least partly based on the provided real word location information related to that gaming object,
  wherein said identify a potential future game event or a combination of future game events is based on the tracking data and/or historical tracking data from other video streams.

21. A system for user interaction with a video stream, said system comprising:
  an apparatus according to claim 19 receiving a video stream
  a monitor connected to the apparatus and fed with an augmented video stream for presentation, and
  a user element for user interaction with the augmented video stream as presented on the monitor.

* * * * *